Jan. 19, 1965   F. BILD ET AL   3,166,616
MANUFACTURE OF PLASTIC TUBES
Filed Feb. 14, 1962   2 Sheets-Sheet 1

INVENTORS
FREDERICK BILD
WILLIAM ROBINSON

BY Cushman, Darby & Cushman
ATTORNEYS

Jan. 19, 1965   F. BILD ET AL   3,166,616
MANUFACTURE OF PLASTIC TUBES
Filed Feb. 14, 1962   2 Sheets-Sheet 2

INVENTORS
FREDERICK BILD
WILLIAM ROBINSON

BY Cushman, Darby & Cushman
ATTORNEYS

United States Patent Office 3,166,616
Patented Jan. 19, 1965

3,166,616
MANUFACTURE OF PLASTIC TUBES
Frederick Bild, London, and William Robinson, Welwyn Garden City, England, assignors to Imperial Chemical Industries Limited, London, England, a corporation of Great Britain
Filed Feb. 14, 1962, Ser. No. 173,198
Claims priority, application Great Britain, Feb. 14, 1961, 5,446/61
10 Claims. (Cl. 264—95)

This invention relates to improvements in or relating to the manufacture of plastic tubes. It also relates to the manufacture of tubular thermoplastic film and to the film so made.

In British specification No. 787,479 we proposed a process for the continuous production or treatment of tubular film wherein a gas is admitted to the inside of the tubular film by means of a pipe (referred to therein as a tubular probe) passing through the nip of a pair of nip rollers, between which the tubular film is passed, the nip rollers being adapted to allow the passage of the pipe through the nip. Such adaptation may be effected by providing one or both of the nip rollers with grooves into which the pipe fits, which grooves may be filled with sponge rubber to act as a seal.

We have found that if such a process is applied to a thick walled resilient plastic tube rather than to a tubular film (we define a thick walled resilient plastic tube as one of wall thickness of more than 0.01 inch and of sufficient resilience not to be cracked or unduly deformed in the method of this invention), the tube tends to become creased where it is folded on passage through the nip and the creases form weaknesses in the tube. Further, if the tube is sufficiently thick compared with its diameter, it tends to crack where so folded. The object of this invention is to provide a process in which these tendencies are reduced.

The invention provides a method of continuously passing a thick walled resilient plastic tube (as hereinbefore defined) between nip rollers, wherein the tube is prevented from being wholly flattened at its edges where it passes through the nip by having two stationary probes within the tube, which probes pass through the nip at a position such that they give internal support to the tube at the said edges, so that the tendency of the tube to be creased at the edges is reduced.

The invention is preferably applied to continuously passing the said tube between nip rolls, and admitting a fluid through the nip to within the tube, there being at least one probe passing between the nip rolls having an internal conduit for the purpose of such admission. Such admission is conveniently through one, or both, of the said stationary probes, but it may, if desired, be carried out through an additional stationary probe passing through the nip within the tube, between the said stationary probes at the edge of the tube. The invention may, however, be applied to for instance, the controlled haul off of a tube from a die where no admission of fluid through the nip is required. The nip rollers are adapted to allow the passage of the probes through the nip for instance as in British specification 789,479 by providing one or both of the nip rollers with grooves into which the probe fits, and preferably filling the grooves with sponge rubber.

The invention as applied to continuously passing the tube between nip rollers, through the nip of which a fluid is admitted, may be further applied to the manufacture of tubular thermoplastic film. In such manufacture a thermoplastic tube may be melt extruded from a die, cooled to below the melting point at least to the extent that it does not adhere to the stationary probes and nip rollers according to this invention, passed through the said nip rollers, heated to a temperature suitable for stretch orienting the tube, the tube is inflated by gaseous pressure to stretch orient it and produce thermoplastic tubular film and finally the tube is hauled off by further nip rollers which serve to prevent escape of inflating gas. The probes are then attached to the die, and conduits for the supply of inflating gas pass through the die and down at least one probe.

The method of the invention is particularly applied to the manufacturer of tubular thermoplastic films of polymers of propylene which are at least 75% insoluble in boiling n-heptane, such as the well known (isotactic) polypropylene. Such polymers are conveniently stretched to a high ratio when oriented and hence require the production of thick walled resilient plastic tubes. These thick-walled tubes may have a wall thickness of up to 0.10 inch or more.

A method for the production of tubular polypropylene film in accordance with the invention will now be described with reference to the accompanying drawings, by way of example.

Figure 1:
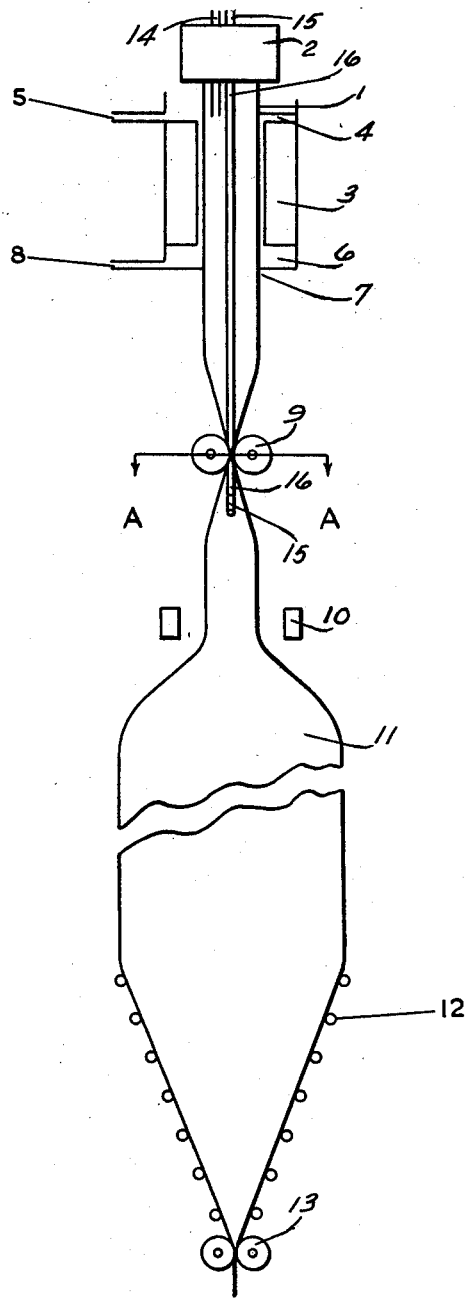
FIGURE 1 is a digrammatic elevation illustrating the manufacture of tubular film by downward extrusion.

In FIGURE 1 a tube 1 of isotactic polypropylene (solubility in n-heptane less than 2%) is melt extruded from a die 2 and passed through a sizing die 3 with water 4 lubrication supplied through the pipe 5. The water is removed by a vacuum device 6 having a ring seal 7 and pipe 8 for application of vacuum. The tube 1 is then passed between nip rollers 9, past infra-red heaters 10 which heat it to the orientation temperature, is stretched and the tubular film 11 produced is flattened by guides 12 and hauled off by further nip rollers 13. A conduit 14 passing through the die 2 supplies gaseous pressure at somewhat above atmospheric pressure to assist sizing by the sizing die 3. A probe 15 attached to the die having a conduit within it supplies the gaseous pressure for inflation through the nip rollers 9. A solid probe 16 in front of the probe 15 is also attached to the die.

Figure 2:
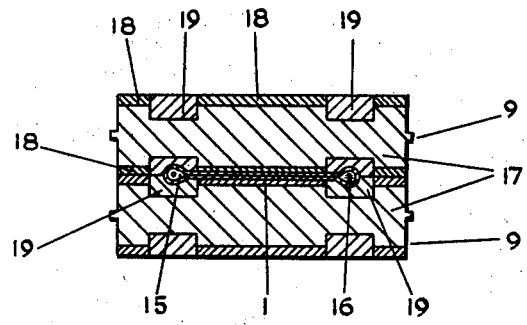
FIGURE 2 is a cross section along the line A—A of FIGURE 1 showing the arrangement of probes at the inside edges of the tube and FIGURE 3 is a cross section of an alternative to FIGURE 2 in which the probes at the inside edges of the tube are solid and there is provided an additional hollow probe for the admission of gas.

In FIGURE 2 the nip rollers 9 are provided with a steel core 17 covered with relatively hard rubber sections 18 and sponge rubber sections 19. The solid probe 16 passes through the nip at one edge of the tube 1 while the probe 15 having a conduit passes through the other.

Figure 3:
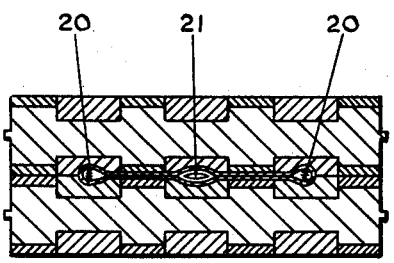

In FIGURE 3 both probes 20 at the edge of the tube 1 are solid and there is provided in addition to them a hollow probe 21 through which inflating gas may be passed.

An advantage of the absence of sharp creases made by wholly flattening the tube 1 arises from the absence of substantial weaknesses at the site of creases in the tubular film. This permits the tubular "lay flat film" produced to be slit at one edge only and the slit film to be opened out to give double width "flat film." In this way the size of the inflated tubular film may be halved for the same width of "flat film" (compared with the case in which lay flat film is slit at both edges because of weaknesses at the edges due to creasing of the tube caused by the nip rollers).

We claim:
1. A method of continuously passing a thick walled resilient plastic tube between nip rollers, wherein the tube is prevented from being wholly flattened at its edges which comprises passing said tube provided at its interior with two stationary probes between said nip rollers, said probes passing through the nip at a position such that they give internal support to the tube at the said edges, so that the tendency of the tube to be creased at the edges is reduced.

2. A method according to claim 1 in which the tube is continuously passed between nip rollers and a fluid is admitted through the nip to within the tube, there being at least one probe passing between the nip rollers having an internal conduit for the purpose of such admission.

3. A method according to claim 2 in which the admission of a fluid is through at least one of the said stationary probes.

4. A method according to claim 2 in which such admission is through an additional stationary probe passing through the nip within the tube between the said stationary probes at the edges of the tube.

5. A method of producing tubular thermoplastic film which comprises melt extruding a thermoplastic tube from a die, cooling said tube to below the melting point at least to the extent that it does not adhere to stationary probes and nip rollers, passing said tube between said nip rollers wherein said tube is prevented from being wholly flattened at its edges where it passes through the nip having two stationary probes within the tube, which probes pass through the nip at a position such that they give internal support to the tube at its edges so that the tendency of the tube to be creased at the edges is reduced, heating said tube to a temperature suitable for stretch orienting the tube, inflating the tube by gaseous pressures to stretch orient it and produce biaxially oriented thermoplastic tubular film, and hauling off said tube by further nip rollers which serve to prevent the escape of said inflating gas.

6. A method according to claim 5 wherein the tubular thermoplastic film is a polymer of propylene which is at least 75% insoluble in boiling heptane.

7. A method according to claim 5 in which after the tube has been stretched to produce tubular film said film is slit at one edge only and opened out to give double width film.

8. The method according to claim 5 in which the tube is continuously passed between nip rollers and a fluid is admitted through the nip to within the tube, there being at least one probe passing between the nip rollers having an internal conduit for the purpose of such admission.

9. The method according to claim 8 in which the admission of a fluid is through at least one of the mid stationary probes.

10. The method according to claim 8 in which such admission is through an additional stationary probe passing through the nip within the tube between said stationary probes at the edges of the tube.

References Cited by the Examiner

UNITED STATES PATENTS 2,495,314   1/50   Caldwell _____ 29—157 X

FOREIGN PATENTS 787,479   12/57   Great Britain.

ROBERT F. WHITE, *Primary Examiner.*

MORRIS LIEBMAN, ALEXANDER H. BRODMERKEL, *Examiners.*